July 31, 1928.
S. L. C. COLEMAN
VEHICLE SUSPENSION
Filed June 21, 1923
1,678,847
4 Sheets-Sheet 1
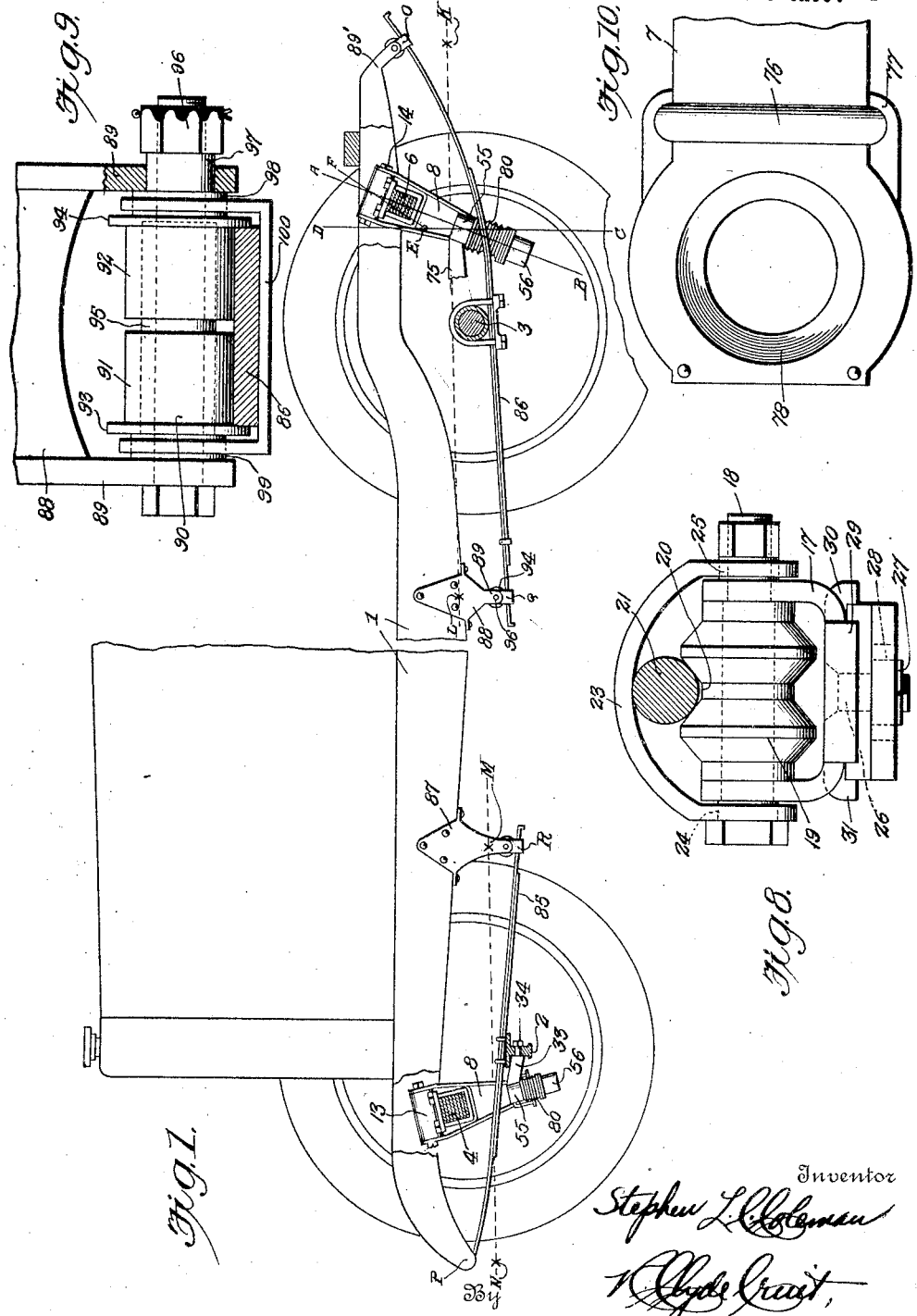
Inventor
Stephen L. Coleman
By Clyde Grist,
Attorney

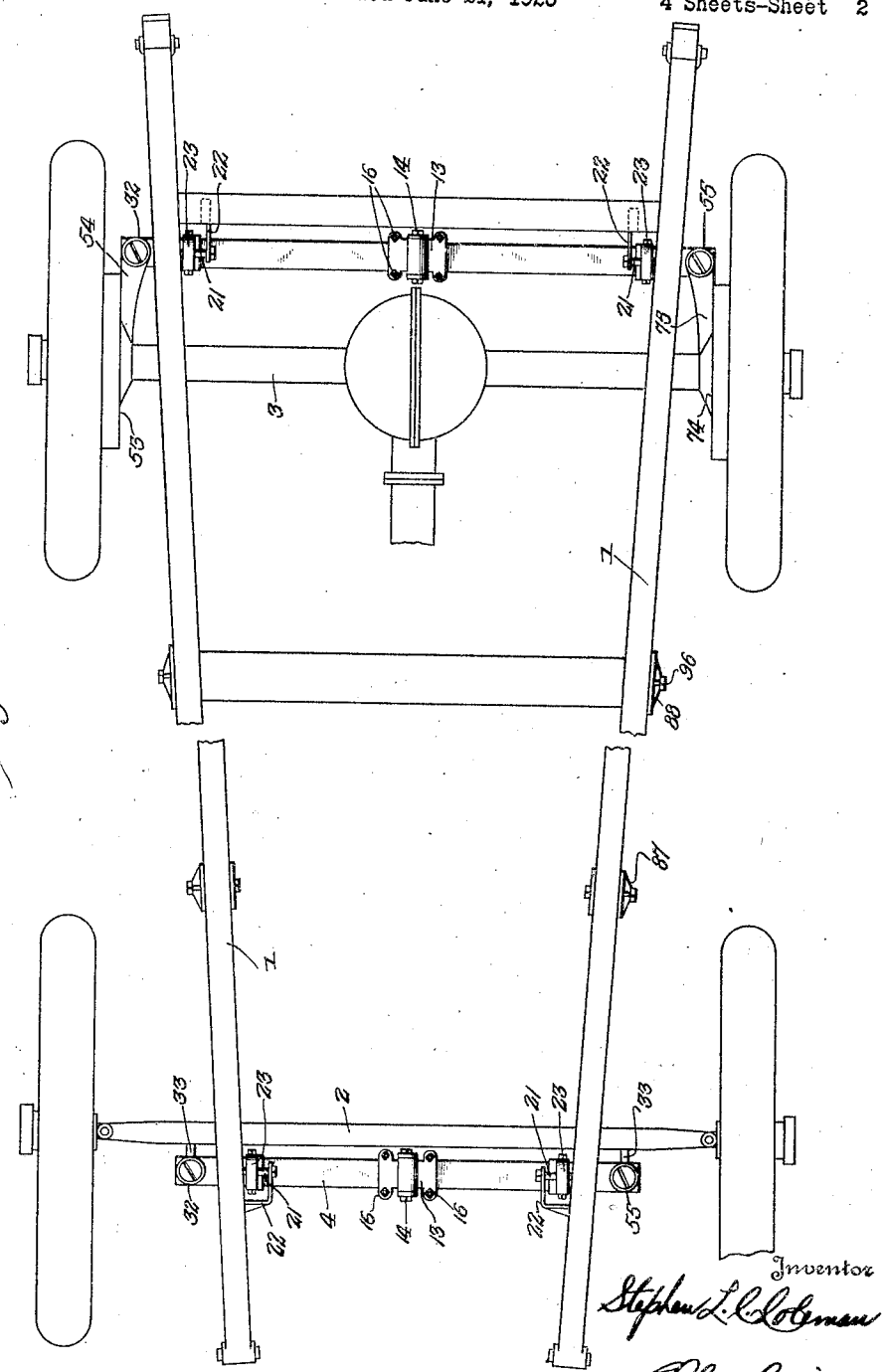

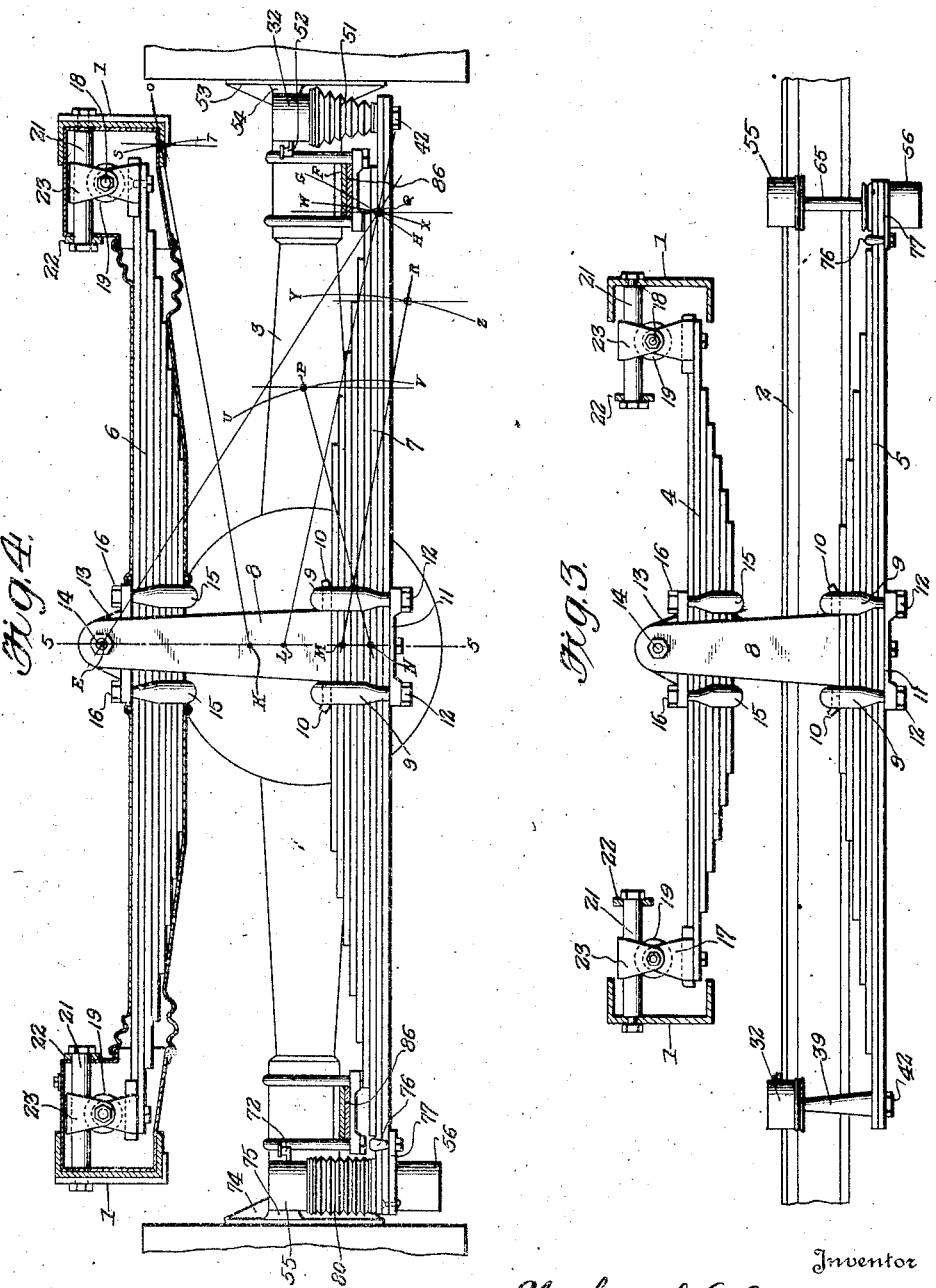

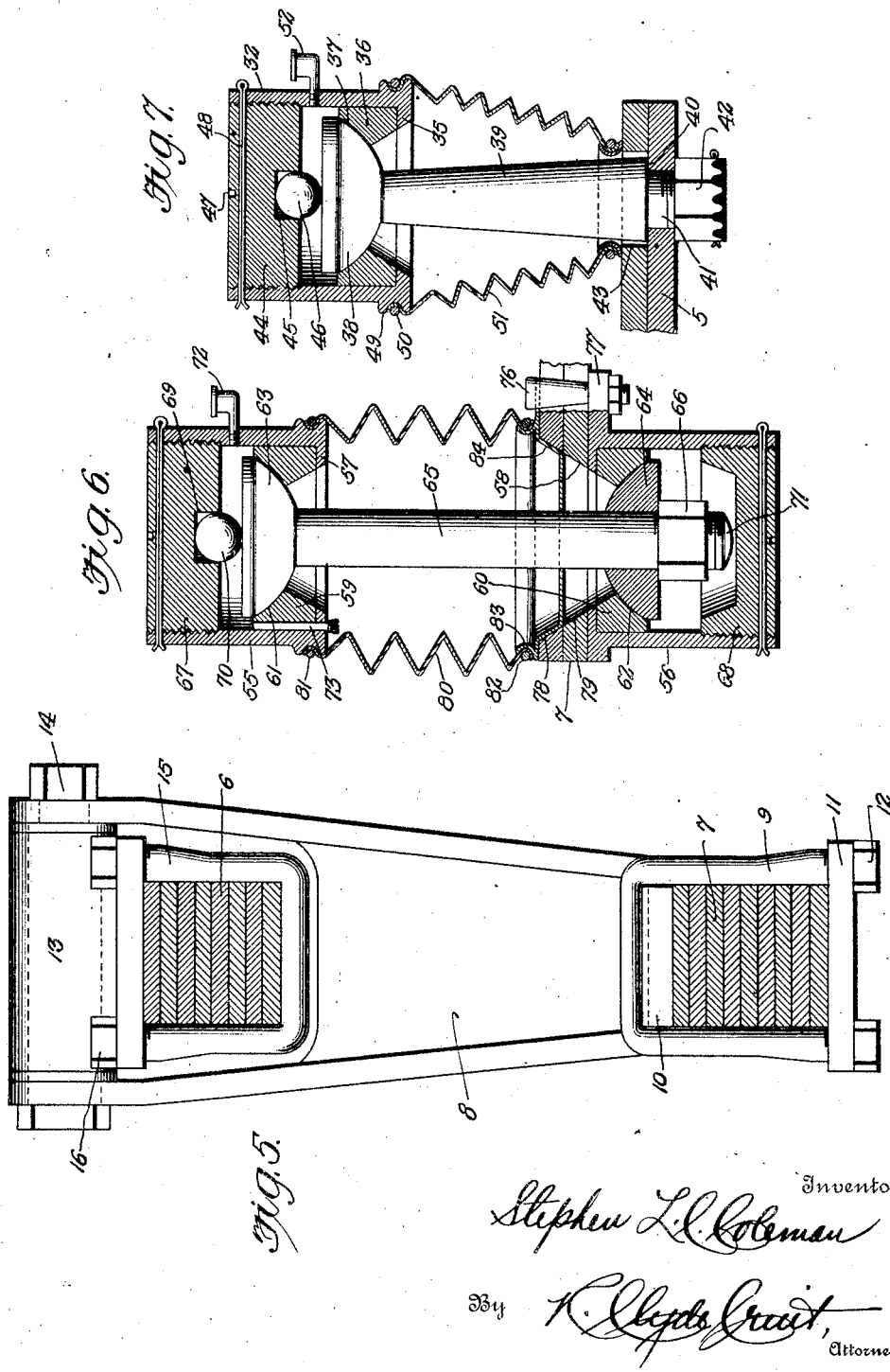

Patented July 31, 1928.

1,678,847

UNITED STATES PATENT OFFICE.

STEPHEN L. C. COLEMAN, OF FREDERICTON, NEW BRUNSWICK, CANADA, ASSIGNOR TO COLEMAN AUTO SPRING SUSPENSION COMPANY, LIMITED.

VEHICLE SUSPENSION.

Application filed June 21, 1923. Serial No. 646,977.

This invention relates to certain improvements in vehicle suspensions and particularly to an improved spring suspension for motor vehicles.

The object of the invention is to produce a spring suspension which will, in effect, permit the spring supported portions of the vehicle to substantially float along without vertical movement, rolling or pitching, while the wheels follow the contour of the road surface and maintain therewith contact at all times.

Another object resides in the combination of means for connecting the various springs to the chassis, so that they can perform their desired functions, eliminating side sway and heavy twisting strains in the frame and body, greatly reducing rolling, overbounding, after-bounding and pitching, and also increasing the flexibility of the suspension under one wheel shocks.

Further resulting advantageous features are to be noted in that no rebound checks or shock absorbers are required, and by reason of the low, unsprung weight, wide loading on both axles and frame, and reduced undesirable motions of the frame and body, the vehicle will hold the road well at high speeds and give greater comfort to the occupants.

All of the objects above enumerated are accomplished at a moderate first cost, permitting easy replacement of wearing parts and insuring long life for the vehicle, and the long spring base as compared to the wheel base, results in less rise and fall at the extremities of the frame under a given rise at the points of spring attachment.

Generally stated, the improved suspension comprises a combination of front and rear transverse load-bearing springs, preferably arranged at an angle to the vertical, and cooperating front and rear longitudinal springs.

These front and rear transverse springs each comprise upper and lower semi-elliptical leaf spring members, mounted one above the other, being clamped at their intermediate portions and spaced apart by a substantially U-shaped strut, which forms, at the same time, a pivotal connection between the upper and lower spring members, said pivot point being preferably above the top spring to add to the stability of the vehicle, this same arrangement being used for both the front and rear transverse springs. In mounting the transverse spring members, one pair is positioned in front of the front axle and the other behind the rear axle.

Both ends of the front and rear upper transverse spring members are connected to the chassis or vehicle frame by a roller and track arrangement, whereas the ends of the front and rear lower transverse spring members are supported by ball and socket joints, all of which is clearly shown in Figs. 3 and 4 taken in conjunction with Figs. 6, 7 and 8.

These transverse springs are in reality the load-bearing springs, but cooperating therewith and to prevent excessive lateral movement of the vehicle body or frame, there are provided longitudinal springs arranged similarly to the usual longitudinal springs, but in the present instance, these springs, carrying only a small percentage of the load, are constructed preferably with only two leaves and the ends thereof have a rolling contact with the chassis or frame.

The preferred embodiment of the invention is illustrated in the accompanying drawings in which Fig. 1 is a view partly in section and partly in elevation, of the complete suspension, parts being broken away in order to show as large as possible the essential features of the invention;

Fig. 2 is a plan view similarly arranged, the transverse load-supporting springs, for the purpose of clearness in illustration, being shown vertically arranged and not at an angle to the vertical as they are in reality as shown in Fig. 1;

Figs. 3 and 4 are enlarged views of the front and rear transverse springs respectively, illustrating the means of connecting the ends of the different spring members to the chassis;

Fig. 5 is an enlarged detail view, partly in elevation and partly in section, of the clamping pivotal bracket construction connecting the intermediate portions of each pair of front and rear transverse spring members, taken on lines 5—5 of Figs. 3 and 4;

Fig. 6 is an enlarged detail view, partly in section and partly in elevation, of the ball and socket connection for one end of the lower rear and front transverse spring members;

Fig. 7 is an enlarged detail view, partly in elevation of the ball and socket connection used on the other end of the lower rear and front transverse spring members;

Fig. 8 is an enlarged detail view of the roller connection provided on the opposite ends of the upper spring members of both the front and rear transverse springs;

Fig. 9 is a detail view of the preferred roller connection for the opposite ends of the rear longitudinal springs and the after ends of the front longitudinal springs.

Fig. 10 shows the formation of the end of the lower rear and front spring member where the double ball and socket joint is used.

Referring to the drawings in detail, 1 represents a frame of any improved construction supported upon front and rear axles 2 and 3 respectively.

Interposed between the axles 2 and 3 and the frame 1 are load-supporting, semi-elliptical, transverse springs, preferably arranged at an angle to the vertical for a purpose to be hereinafter more fully described. The front transverse spring comprises an upper spring member 4 and a lower spring member 5, and similarly the rear transverse spring is constructed with an upper spring member 6 and a lower spring member 7. The intermediate portions of the respective spring members 4 and 5 and 6 and 7 are pivotally connected together and maintained in spaced relation by a substantially U-shaped strut or the like 8. This strut in each instance, is rigidly connected to the lower transverse spring members 5 and 7 by a pair of U-bolts 9, suspended from outwardly extended ears or lugs 10 carried by the base of the strut 8, said bolts having their threaded ends passing through a clamping plate 11 and secured thereto by nuts 12, the setting up of these nuts completing and insuring the positive clamping of the leaves of the spring together and to the base of the strut. Between the upper ends of the strut 8 is pivotally mounted a plate 13, a bolt 14 forming the necessary connection. Cooperating with the plate 13 are two oppositely disposed U-bolts 15 equipped with nuts 16, rigidly securing the plate 13 to the intermediate portions of the upper front and rear transverse spring members. It is to be understood that the above described pivotal connection is the same with respect to both the front and rear transverse springs, as clearly shown in Figs. 3 and 4.

The opposite ends of both the front and rear upper transverse spring members 4 and 6 respectively are connected to the frame of chassis 1 by a roller and track construction of a similar type, so that the same description will suffice for all of these connections.

Mounted upon each end of the springs above enumerated is an upstanding U-shaped bracket 17 supporting a bolt 18 carrying a roller 19. This roller is provided with a V-shaped circumferential groove 20 adapted to have a rolling contact with a rod or bolt 21 extending inwardly from the frame of the chassis, the inner end of said bolt being supported from the frame by a bracket member 22 (see Figs. 2, 3 and 4). To maintain the roller 20 in contact with the rod or track 21, there is provided a yoke 23, the legs of which extend down alongside of the upstanding arms of the bracket 17 and maintained in this position by the bolt 18. It is to be noted that adjoining the head of the bolt 18 there is a shoulder 24, maintaining a space between the head of the bolt and the adjacent arm of the bracket 17. To obtain the same effect at the other end of the bolt 18, a thickened washer or bushing 25 is used, all of which is clearly shown in Fig. 8. At these points just referred to the yoke 23 is pivotally mounted and permitted to have a limited lateral movement in order to prevent binding thereof under a side thrust.

The bracket 17 is secured to the top leaf of the spring by a bolt 26 passing through the base of the bracket and spring leaf and secured by a nut 27, the base of the nut engaging the underside of the top leaf of said spring, the second leaf of the spring being provided with an opening 28 slightly larger than the nut to permit this, and also to allow for the relative movements of the two leaves during the flexing of the spring. The base of the bracket 17 is also provided with three lips 29, 30 and 31 bent downwardly over the end and sides respectively of the spring leaf, thus anchoring the bracket against rotation.

One end of each of the lower spring members 5 and 7 of the front and rear transverse springs is connected to the front and rear axles 2 and 3 respectively, by ball and socket joints constructed as shown in Fig. 7. This joint comprises a cylindrical housing 32 supported from the axle 2 by a bracket arm 33 (see Fig. 1), provided with a bolt and nut securing means 34. The lower end of the housing 32 is constructed with an inwardly extending annular rim or flange 35 supporting a ring-like member 36 provided with a spherical seat 37, for the reception of a semi-spherical head 38 carried by the upper end of the bolt or rod 39 secured at its lower end to the spring member 5. Upon referring to Fig. 7 it will be noted that this lower end of the bolt 39 is provided with a shoulder 40 and a reduced threaded end 41, so that, in applying the nut 42, the lower leaf of the spring 5 will be secured between said shoulder and nut. The second leaf of the spring is cut away slightly around the bolt 39 as at 43 to permit the free sliding contact between these spring leaves during the flexing of the spring.

The upper peripheral surface of the housing 32 is threaded to receive an exteriorly threaded plug or the like 44, for providing the necessary adjustments. Centrally arranged in the inner face of the plug 44 is a recess 45 partially enclosing a ball 46, said ball being adapted to bear upon the upper face of the semi-spherical head 38 and maintain said head in proper engagement with its seat 37, at the same time permitting a rocking movement of the head on its seat without binding. As hereinbefore stated, the proper adjustments for wear and the like is obtained by a screwing or unscrewing as the case might be, of the plug 44, the upper face of the plug being provided with intersecting grooves for the reception of a cotter pin or the like 48, whereby said plug can be locked in its properly adjusted position in an obvious manner.

In the preferred construction of the joint and in order to exclude dust and dirt from the working parts thereof, the lower outer edge of the housing 32 is formed with an annular groove 49 for clamping therein, by a split-ring or the like 50, the upper edge of an oil-proof bellows-like member 51, the lower end of said member being secured about the lower end of the bolt 39 as clearly shown in Fig. 7. An oil cup 52 provides the necessary means for lubricating the ball and socket joint. This joint, in conjunction with the double ball and socket joint on the opposite end of the spring and the roller and track arrangement at the ends of the upper spring members, permits a rocking movement of the springs 4 and 5 fore and aft, and a free rise and fall of the spring as a whole at its center, but restricts movements of the spring endwise and acts to position both springs members 4 and 5 in a lateral direction.

The construction of joint as above described, as hereinbefore stated, is employed in connection with one end of the lower spring member 7 of the rear transverse spring, but in this latter instance the housing 32 is secured to the brake-drum housing 53 of the rear axle housing by a rearwardly extending bracket arm 54 as shown more clearly in Fig. 2.

The other end of each of the lower spring members 5 and 7 of the transverse springs, is secured by a double ball and socket joint forming substantially a universal joint, the same being shown in detail in Fig. 6. This joint comprises upper and lower cylindrical housings 55 and 56 respectively. Similar to the construction shown in Fig. 7 the inner ends of the said housings are formed with inwardly projecting annular shoulders or flanges 57 and 58 for receiving ring-like bearing members 59 and 60 provided with spherical seats 61 and 62 for cooperation with semi-spherical heads 63 and 64 carried at each end of the bolt 65, the lower semi-spherical head 64 being removable for the purpose of assembly and normally held in operative position by a nut or similar fastening 66. The inner periphery of the outer ends of the housings 55 and 56 are provided with threads for the reception of adjusting plugs 67 and 68, maintained in their adjusted positions by a locking pin and groove arrangement previously described in connection with Fig. 7. Likewise similar to the construction shown in Fig. 7, the upper screw plug 67 is formed with a recess 69 partially enclosing a ball 70 providing antifrictional single point contact with the upper flat portion of the semi-spherical head 63. The lower end of the bolt 65 is rounded as at 71 in order to prevent binding with the inner face of the plug 68 under working conditions. Both semi-spherical ends of the bolt 65 of this joint are lubricated through an oil-cup 72, the oil being fed from the upper to the lower ball and socket joint by a wick or the like 73.

In mounting this joint, the upper housing 55 is supported from the brake-drum housing 74 by a rearwardly extending bracket arm 75 (see Fig. 2), and the lower housing 56 is fastened to the end of the lower, rear and front transverse spring members 7 and 5 by a U-shaped clamp 76, and two rivets, said housing 56, at its inner end being provided with an extended flange 77. The leaves of this end of the spring are constructed with beveled circular openings 78 and 79, and said leaves are made wider or spread at this point to prevent weakening thereof, as shown in Fig. 10. The beveled openings are necessary to permit the proper functioning of the joint and allow for the lateral movements of the bolt 65 under working conditions.

The working parts of this joint are also inclosed in an oil-proof bellows-like member 80 secured at its upper end to the bottom side of the housing 55 by a split ring and groove arrangement 81 in a manner similar to that shown in Fig. 7 and described in connection therewith. The lower end of the bellows-like member 80 is similarly secured by a split-ring and groove 82, but in this instance the annular groove is formed in a ring 83 fastened to a sheet metal plate 84 mounted in the beveled opening 78 of the spring 70 and secured thereto by the clamp 76.

The present invention also contemplates an oil-proof housing for the track and roller connections, completely enveloping these working parts as clearly shown in Fig. 4, maintaining them in a clean and lubricated condition at all times.

In addition to the load-bearing transverse springs, and cooperating therewith, are front and rear longitudinal springs 85 and 86 positioned similar to the usual longitudinal springs, but in the present construction these springs are preferably constructed with only two leaves to each spring. Both front and rear longitudinal springs 85 and 86 are secured to their respective axles 2 and 3 in the customary manner, but the ends thereof, with the exception of the front ends of the front springs, have a rolling contact with their supporting hanger brackets 87 and 88, and the rear ends of the chassis as shown in 89'.

The type of rolling connection employed is illustrated in detail in Fig. 9. The hanger bracket 88, which is taken for example, has two downwardly extending arms 89 between which is mounted for rotation, on a bolt 90, a split roller comprising sections 91 and 92 provided around their outside ends with flanges 93 and 94 respectively, which fit snugly against the sides of the spring leaf 86 giving added leverage and friction to ensure a revolving of the roller sections 91 and 92. These roller sections are provided with a bushing 95 forming the necessary bearing between the roller sections and the bolt 90. This bolt is held in position by a nut 96 and this nut is set up against a spacing washer 97, which, in turn, engages a larger spacing washer 98 in contact with flanged end of the roller section 92. The flanged end 93 of the roller section 91 is likewise in engagement with a tubular washer or spacer 99, so that an adjustment of the roller flanges 93 and 94 against the edges of the spring 86 is obtained by tightening the nut 96, whereby the spacer 97 will be forced against the larger spacer 98 which, in turn, will press the roller section 92 further on its bushing and closer to the complementary section 91, thus narrowing the distance between the roller flanges 93 and 94.

In order to maintain the ends of the springs 86 and the like, at all times in contact with the roller sections 91 and 92, a yoke 100 is provided, passing under the spring and pivoted at its upturned ends about the spacers 98 and 99 as clearly shown in Fig. 9. The spacing washers 98 and 99 are thicker or wider than the ends of the yoke 100, so that free movement of the yoke is always assured.

In positioning these longitudinal springs with respect to the frame, it is to be noted that the rear ends of the front longitudinal springs are mounted comparatively low with respect to the front ends thereof, while the rear ends of the rear longitudinal springs are mounted comparatively high with respect to their front ends, and this fact has much to do with the question of stability as will be hereinafter explained. The principal function of the longitudinal springs is to keep the axles in their proper lateral position, prevent lateral movement of the frame relative to the running gear, balancing and stabilizing the said frame and to carry only a small portion of the load.

In explaining the action of the suspension, it will be assumed that one end only of the axle is raised four inches, and providing the two springs 6 and 7 are of the same stiffness, each end of each spring will be flexed one inch. To facilitate explanation, one spring at a time will be considered. Supposing one end of the axle is raised two inches, then each half of the lower spring will be bent one inch each, assuming that no movement of the frame or upper spring takes place. Then if the end of the axle is raised two additional inches, the center of the lower spring will raise one inch, which will bend each end of the upper spring one inch, thus making an equal flexing in all four quarter elliptic springs. The force required to bend one of the quarter elliptic springs, that is each half of the semi-elliptic springs, one inch, would bend all four one inch, they being in series with each other. This fact doubles the flexibility of this suspension under one wheel shocks.

Heavy twisting stresses in the frame and body are set up in a vehicle equipped with conventional springs, when it passes over an obstruction with one wheel only. In the present suspension, because of the equalization of one wheel shocks between the two transverse spring members and the resulting equal upward pressure on both sides of the frame, no weaving or twisting stresses are set up from this source, and because of the small relative stiffness of the longitudinal springs, they could not cause weaving or twisting of the frame.

Because of the fact previously explained that the pressure of the main suspension springs or transverse springs against the frame is always approximately equal at either end of the upper spring, the frame receives no rolling impetus from these springs when passing over uneven road surfaces.

After a casual inspection, one might expect the vehicle to roll with the main pivots 14 as an axis of rotation, but the axis of the pivots 14 do not lie horizontally (see Fig. 1) and if produced will meet at an angle of approximately 148 degrees, therefore very little motion could take place on such a crooked axis. The pivots 14 are a considerable height above the points where the longitudinal springs are attached to the frame of the vehicle, and this fact is a bar to the vehicle rolling about the pivots 14. Referring to Fig. 4, E is the center of the main weight carrying pivot 14, the point Q where the front end of the rear longitudinal spring is connected to the frame, the other end being connected to the frame at point O and the center of the spring fixed to the axle at point F. If the frame rotates about the center E, the points Q and O also have to rotate about the same center. With center E and radius E—Q, described the arc G—Q—H and this would be the path that Q would have to follow. In a fall of one inch this arc diverges three quarters of an inch from the perpendicular. The longitudinal springs being without flexibility sideways and firmly attached to the axle and frame against lateral movement, such a divergence would be impossible, and therefore rolling cannot take place with the pivots 14 as a center of rotation.

Rolling, affects all of the suspension springs and not those at one end only. In Fig. 1 the only feasible rolling axis is shown by the dotted line K—L—M—N. This axis is plotted by taking the mean height of the points O—Q of attachment of the rear longitudinal springs and the mean height of the points P—R of attachment of the front longitudinal springs and draw the line K—L—M—N through these two means. The points O and P are a considerable distance above the rolling axis and the points Q and R an equal distance below said axis, thus making the vehicle very stable against side-sway and cause an interference against roll, the extent of which is plotted in Fig. 4. Here the points K—L—M—N are the same points on the rolling axis marked by the same letters in Fig. 4, and the points O Q R and P are the same points where the longitudinal springs connect with the frame as shown in Fig. 1. All the points mentioned are plotted in their correct relative positions in both planes, and all the points K—L—M—N and O—Q—R—P have identical positions on both sides of the chassis.

If the vehicle rolls on the axes K—L—M—N, the point O will follow the path of the arc S—T, which is struck with the center K and radius K—O. In a fall of one inch, O diverges three-sixteenths of an inch from the perpendicular, which means that in order for this movement to take place the longitudinal springs would have to be bent sideways three-sixteenths of an inch, which is impossible with the forces involved. Similarly the points Q R and P diverge from the perpendicular when following the path of travel which their centers of rotation dictate, and on the opposite side of the chassis, the longitudinal springs would be resisting roll in a similar manner.

Any rolling of the frame would entail torsioning of all the longitudinal springs, and the direct resistance of the two longitudinal springs on the side towards which the roll takes place.

The effect of shifting in a lateral direction of the main support pivots will be noted as follows. If the left wheel encounters a road obstacle, causing it to rise, the lower transverse spring will tilt with it and the pivot 14 will move to the right, taking with it the upper spring, and ends of this spring with its roller connection, traveling easily along its tracks. This movement will approximate one inch under a wheel rise of four inches (see Fig. 4).

This shifting of the points of frame support in a lateral direction, will help very materially to prevent the side of the vehicle on which the obstacle has been encountered, from rising higher than the other side, under the influence of the highly compressed longitudinal spring on that side of the vehicle. The longitudinal springs being flexible and acting as balancers and stabilizers, carrying only a small percentage of the load, have little effect against the inertia of the frame and body under one wheel shocks, and whatever effect they might have is largely offset by the shifting in a lateral direction of the main support springs.

Tending toward a great reduction in overbounding, afterbounding and pitching, the upper and lower member of each transverse spring can be of different stiffness so that their periodicity is not identical, producing a dampening effect.

Because of the equalizing effect caused by the pivotal connection between the upper and lower transverse springs, the amount of compression of each individual quarter elliptic section of the springs, when a road obstacle is encountered, is reduced, and its rebound is correspondingly reduced. This applies only to one wheel shocks, but practically every road obstacle causes one wheel to rise sooner or higher than the other, so that this principle constantly comes into operation.

Referring to Fig. 1, the transverse springs are shown placed at an angle of twenty degrees to the perpendicular when under full static load. When the axle rises to the top of its stroke in relation to the frame, the point of spring support on the axle raises to E and the compressed springs will then lie at an angle F—E—D, or 35 degrees to the perpendicular. This increase of 15 degrees in the angle of the spring to the perpendicular, slows down very materially the first part of the return stroke of the springs, and gives the wheel time to pass beyond the obstruction before the springs have had time to overcome the inertia of the body and start it moving upwardly. The wheel having surmounted the road obstacle, drops back to the original level, the extra force stored up in the springs having been dissipated without disagreeable effect. Of course all road obstacles are not of a type that the wheel can surmount in a small fraction of time, but the vast majority are, and in any event the change of angle will necessitate a greater length of time to raise the load and have a dampening effect on the return action of the spring when it is heavily compressed. At the same time, the first part of the spring stroke will be little affected and will be efficient to take care of small rapidly re-occurring shocks. After-bounding and pitching are largely governed by the same elements as those governing over-bounding, and if one is reduced, obviously all will be reduced.

It is to be understood that the invention is not limited to the specific types of longitudinal springs, rolling shackles and ball and socket joints, or to the exact combination and arrangement of these parts as shown, as obviously other arrangements or devices may be used to accomplish the same result.

Further, although it is preferable to install the suspension at both ends of the vehicle, yet it would work satisfactorily if installed at one end only with a conventional spring design at the other.

What I claim is:

1. In a vehicle suspension, the combination with a frame and running gear, of front and rear transverse springs, means for yieldably connecting said springs to the frame and running gear, and means for preventing lateral movements and excessive rolling of said frame on the running gear.

2. In a vehicle suspension, the combination with a frame and running gear, of front and rear transverse springs, flexible means for connecting said springs to the frame and running gear, and means for preventing lateral movements and excessive rolling of said frame on the running gear.

3. In a vehicle suspension, the combination with a frame and running gear, of front and rear transverse springs, each comprising superimposed spring members, means for yieldably connecting said springs to the frame and running gear, and means for preventing lateral movements and excessive rolling of said frame on the running gear.

4. In a vehicle suspension, the combination with a frame and running gear, of front and rear transverse springs, each comprising superimposed spring members, means for pivotally connecting said spring members together at their intermediate portions, means for yieldably connecting said springs to the frame and running gear, and means for preventing relative lateral movements and excessive rolling of said frame on the running gear.

5. In a vehicle suspension, the combination with a frame and running gear, of front and rear transverse springs, each comprising superimposed spring members, means for spacing said spring members apart and pivotally connecting the same at their intermediate portions, means for yieldably connecting said springs to the frame and running gear, and means for preventing lateral movements and excessive rolling of said frame on the running gear.

6. In a vehicle suspension, the combination with a frame and running gear, of front and rear transverse springs, transversely yieldably means for connecting said springs to the frame and running gear and longitudinal springs for preventing lateral movements and excessive rolling of said frame on the running gear.

7. In a vehicle suspension, the combination with a frame and running gear, of front and rear transverse springs, each comprising superimposed spring members mounted at an angle to the vertical, means for yieldably connecting said springs to the frame and running gear, and means for preventing relative lateral movements of said frame and running gear.

8. In a vehicle suspension, the combination with a frame and running gear, of front and rear transverse springs, means for yieldably connecting said load carrying springs to the frame and running gear, longitudinal springs for preventing relative lateral movements of said frame and running gear, and longitudinally yieldable connections between said longitudinal springs and frame.

9. In a vehicle suspension, the combination with a frame and running gear, of front and rear transverse springs, each comprising superimposed spring members mounted at an angle to the vertical, front and rear longitudinal springs and longitudinally yieldable connections between said longitudinal springs and frame, the points of attachments of the outer ends of the front and rear longitudinal springs to the frame, being in a plane above the points of attachment of the inner ends of said longitudinal springs.

10. In a vehicle suspension, the combination with a frame and running gear, of front and rear transverse springs, each comprising superimposed semi-elliptical leaf spring members, means for clamping the leaves of each spring member together and pivotally connecting the same at their intermediate portions, means for yieldably connecting the ends of the upper spring members to the frame and the ends of the lower spring members to the running gear, and means for preventing lateral movements and excessive rolling of said frame on the running gear.

11. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, means connecting the ends of the upper transverse spring members to the frame to permit a relative transverse movement between said spring and frame, pivotal means connecting the ends of the lower transverse spring members to the running gear and means for preventing lateral movements and excessive rolling of said frame on the running gear.

12. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, means connecting the ends of the upper transverse spring members to the frame to permit a relative transverse movement between said spring and frame, pivotal means connecting the ends of the lower transverse spring members to the running gear, and longitudinal springs for preventing relative lateral movements of said frame and running gear.

13. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, means connecting the ends of the upper transverse spring members to the frame to permit a relative transverse movement between said spring and frame, pivotal means connecting the ends of the lower transverse spring members to the running gear, longitudinal springs and longitudinally yieldable connections between said longitudinal springs and frame.

14. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, transverse sliding connections between the ends of the upper transverse spring members and frame, ball and socket joint connections between the ends of the lower transverse spring members and running gear, and longitudinal springs for preventing relative lateral movements of said frame and running gear.

15. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, transverse sliding connections between the ends of the upper transverse spring members and frame, ball and socket joint connections between the ends of the lower transverse spring members and running gear, longitudinal springs and longitudinally slidable connections between said longitudinal springs and frame.

16. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, means connecting the ends of the upper transverse spring members to the frame to permit a relative transverse movement of said frame, pivotal means connecting the ends of the lower transverse spring members to the running gear, front and rear longitudinal springs and longitudinally yieldable connections between said longitudinal springs and frame, the points of attachment of the outer ends of the front and rear longitudinal springs to the frame being in a plane above the points of attachment of the inner ends of said longitudinal springs.

17. In a vehicle suspension, the combination with a frame and running gear, of front and rear transverse springs, each comprising superimposed semi-elliptical, reversed leaf spring members, means for spacing apart the spring members of each transverse spring and pivotally connecting said members together at their intermediate portions, a roller and track connection between the ends of the upper transverse spring members and frame, ball and socket joint connections between the ends of the lower transverse spring members and running gear, and means for preventing relative lateral movements of said frame and running gear.

18. In a vehicle suspension, the combination with a frame and running gear, of front and rear transverse springs, each comprising superimposed spring members pivotally connected together and mounted at an angle to the vertical, means for yieldably connecting said springs to the frame and running gear, and means for preventing relative lateral movements of said frame and running gear.

19. In a vehicle suspension, the combination with a frame and running gear, of front and rear transverse springs, each comprising superimposed spring members pivotally connected together and mounted at an angle to the vertical, means for yieldably connecting said springs to the frame and running gear, longitudinal springs, and longitudinally yieldable connections between said longitudinal springs and frame.

20. In a vehicle suspension, the combination with a frame and running gear, of front and rear transverse springs, each comprising superimposed spring members pivotally connected together and mounted at an angle to the vertical, means for yieldably connecting said springs to the frame and running gear, front and rear longitudinal springs and longitudinally rolling connection between said longitudinal springs and frame, the points of attachment of the outer ends of the front and rear longitudinal springs to the frame being in a plane above the points of attachment of the inner ends of said longitudinal springs.

21. In a vehicle suspension, the combination with a frame and running gear, of front and rear transverse springs, each comprising superimposed and semi-elliptical, reversed, leaf spring members, means for spacing apart the spring members of each transverse spring and pivotally connecting said members together at their intermediate portions, a roller and track connection between the ends of the upper transverse spring members and frame, a single ball and socket joint between the front axle and one end of the front, lower, transverse spring member and between the rear axle and one end of the rear lower, transverse spring member, a double ball and socket joint between the respective axles and the other ends of the front and rear, lower, transverse spring members, dust proof casings for all of said joints and means for preventing relative lateral movements of the frame and running gear.

22. In a vehicle suspension, the combination with a frame and running gear, of front and rear transverse springs, each comprising superimposed semi-elliptical, reversed, leaf spring members, means for spacing apart the spring members of each transverse spring and pivotally connecting said members together at their intermediate portions, a roller and track connections between the ends of the upper transverse spring members and frame, a single ball and socket joint between the front axle and one end of the front, lower, transverse spring member and between the rear axle and one end of the rear, lower, transverse spring member, a double ball and socket joint between the respective axles and the other ends of the front and rear, lower transverse spring member, longitudinal springs and longitudinally slidable connections between said springs and frame.

23. In a vehicle suspension, the combination with a chassis and running gear, of front and rear transverse springs, each comprising superimposed, semi-elliptical, reversed, leaf spring members, means for spacing apart the spring members of each transverse spring and pivotally connecting said members of each spring together at their intermediate portions, a roller and track connection between the frame and the ends of the upper transverse spring members of both front and rear springs, a single ball and socket joint between the front axle and one end of the front, lower, transverse spring member and between the rear axle and one end of the rear, lower, transverse spring member, a double ball and socket joint between the respective axles and the other ends of the front and rear, lower, transverse spring members, all of said connections being arranged to permit said transverse springs to be mounted at an angle to the vertical, front and rear longitudinal springs and longitudinally rolling connections between said longitudinal springs and frame, the points of attachment of the outer ends of the front and rear longitudinal springs to the frame being in a plane above the points of attachment of the inner ends of said longitudinal springs.

24. In a vehicle suspension, the combination with a frame and running gear, of a transversely disposed spring at one end thereof, mounted at an angle to the vertical means for pivotally connecting said spring to frame and running gear, and means for preventing relative lateral movements of said frame and running gear.

25. In a vehicle suspension, the combination with a frame and running gear, of a transverse spring at one end of said frame, mounted at an angle to the vertical, said spring comprising two spring members one above the other pivotally connected together, means for yieldably connecting said spring to the frame and running gear, and means for preventing relative lateral movements of said frame and running gear.

26. In a vehicle suspension, the combination with a frame and running gear, of transversely disposed springs near one end of said frame, said springs comprising two semi-elliptic leaf members one above the other pivotally connected together and mounted at an angle to the vertical, means for flexibly connecting said springs to frame and running gear, and longitudinally disposed springs connected to the running gear and frame at opposite sides thereof acting to stabilize said frame.

27. In a vehicle suspension, the combination with a frame and running gear, of superimposed transversely disposed springs at one end thereof, said springs being pivotally connected together intermediate their ends, means for pivotally connecting the ends of said springs to the frame and the running gear, and longitudinal springs having relatively high and low points of attachment to the frame.

28. In a vehicle suspension, the combination with a frame and running gear, of front and rear transverse springs to carry a great portion of the entire load on two centrally disposed pivotal points, front and rear longitudinal springs having relatively high and low points of attachment to the frame.

In testimony whereof I affix my signature.

STEPHEN L. C. COLEMAN.